INVENTOR.
CARL SCHLEICHER
BY
Emery, Varney, Whittemore & Dix
ATTORNEYS.

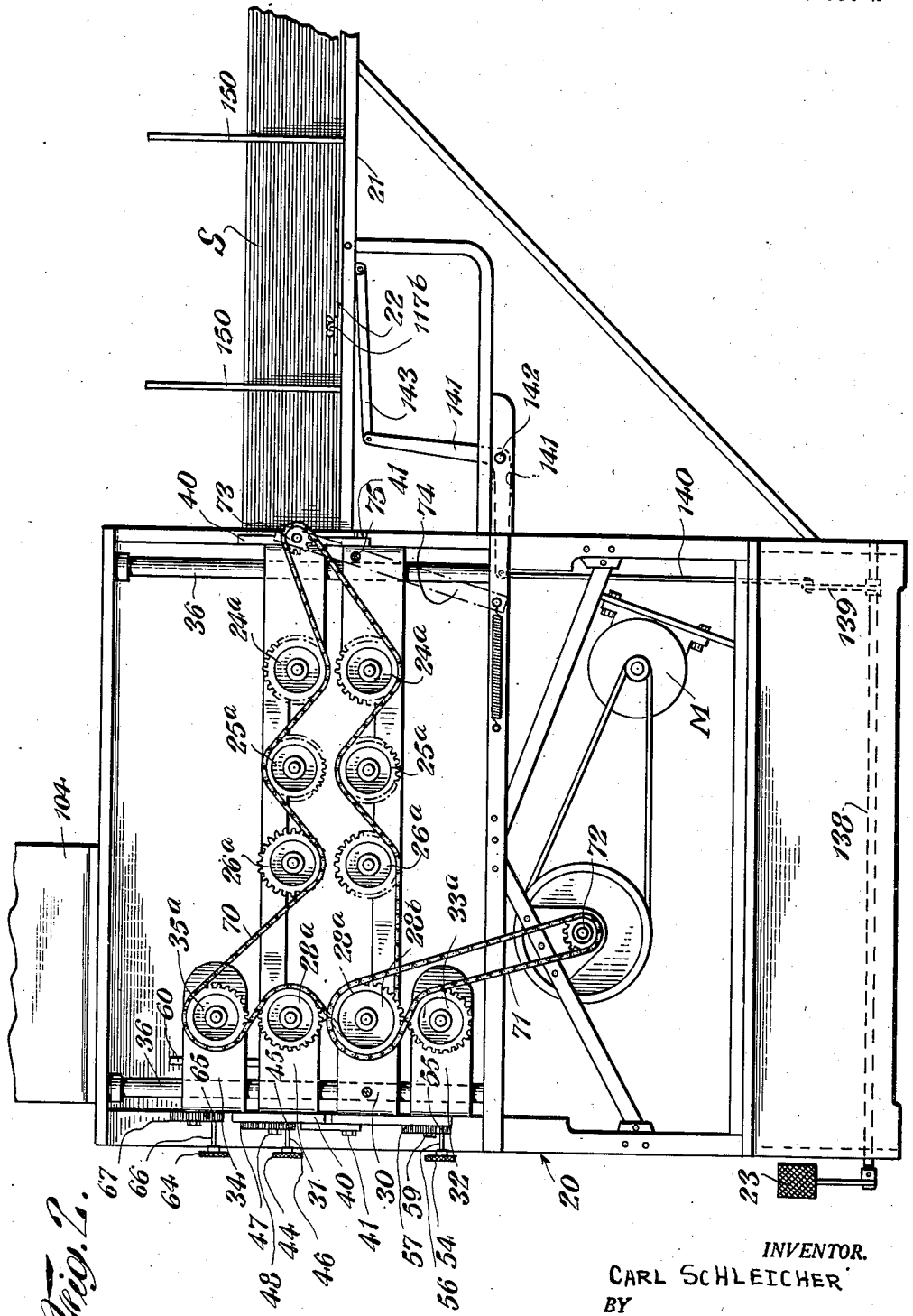

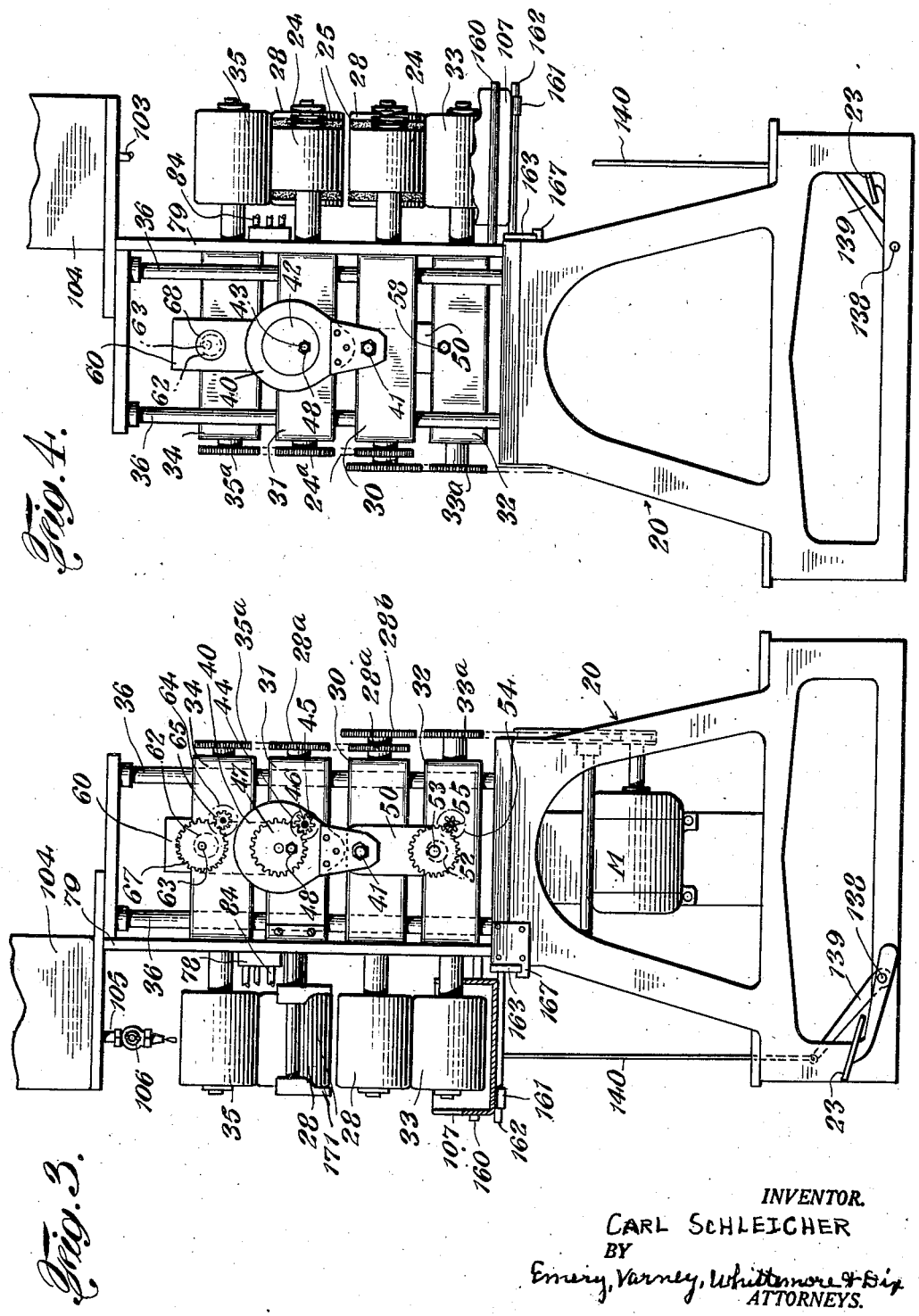

Jan. 25, 1944. C. SCHLEICHER 2,339,952
SURFACE COATING APPARATUS
Filed March 12, 1941 6 Sheets-Sheet 4
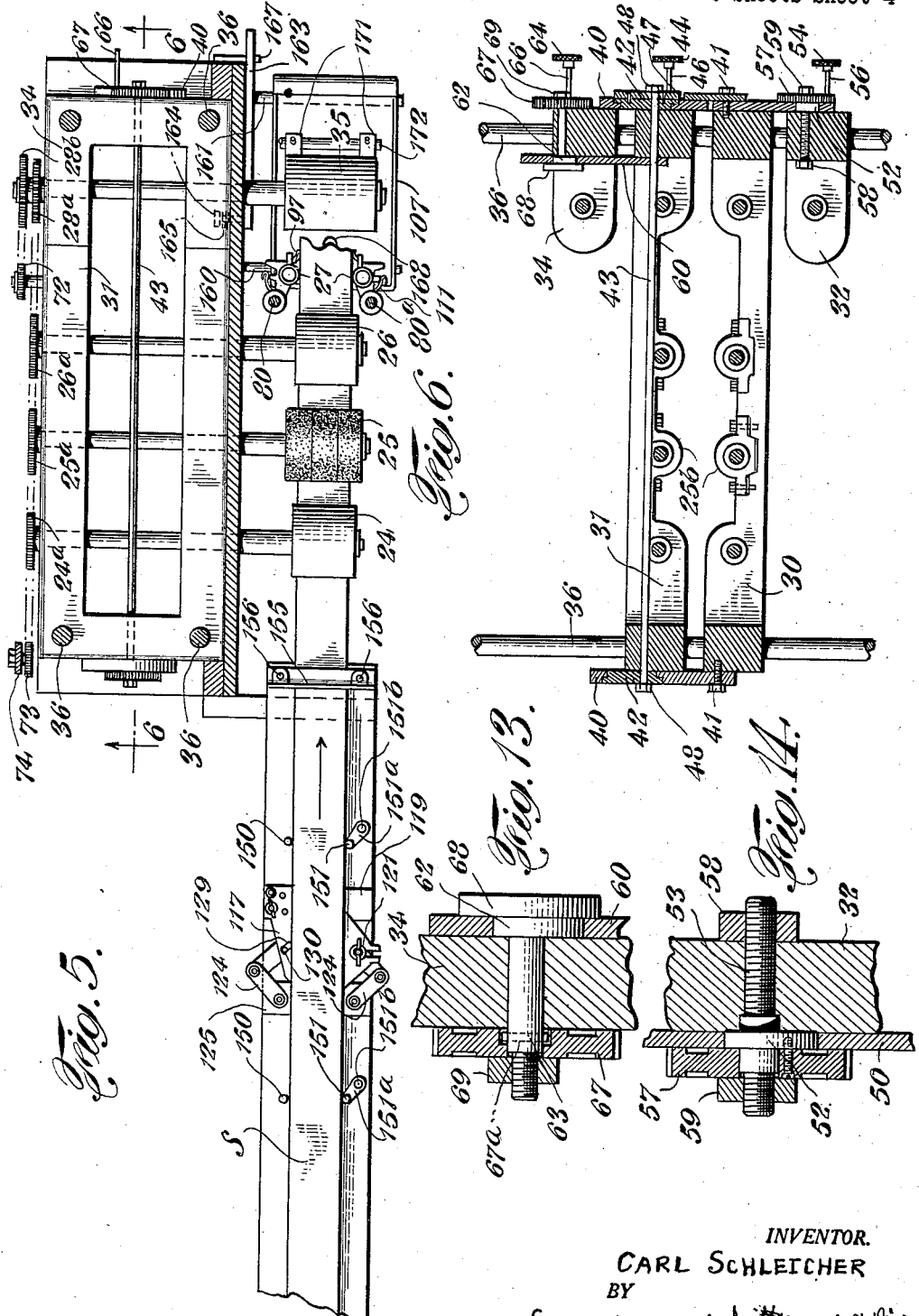
INVENTOR.
CARL SCHLEICHER
BY
Emery, Varney, Whittemore & Dix
ATTORNEYS.

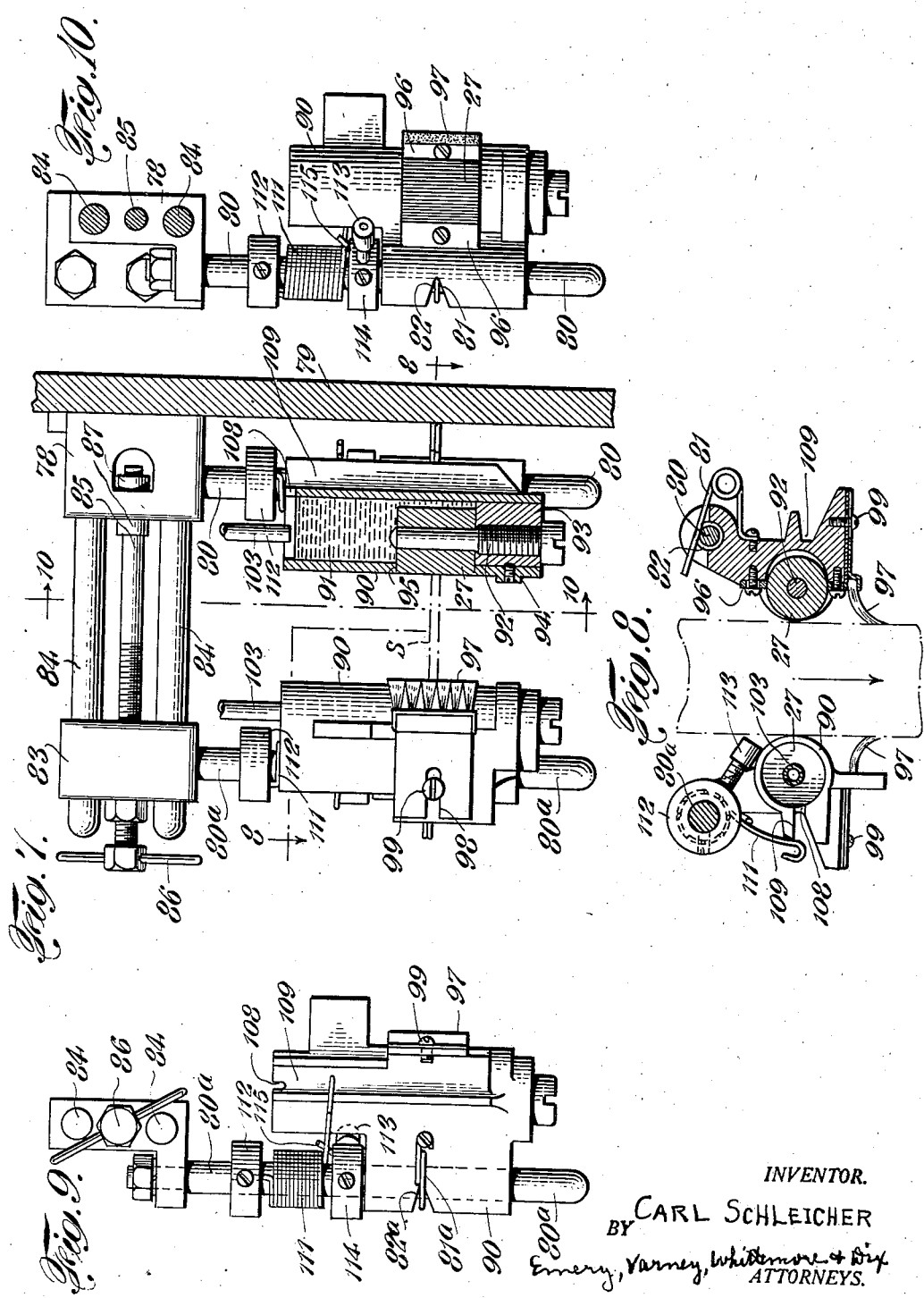

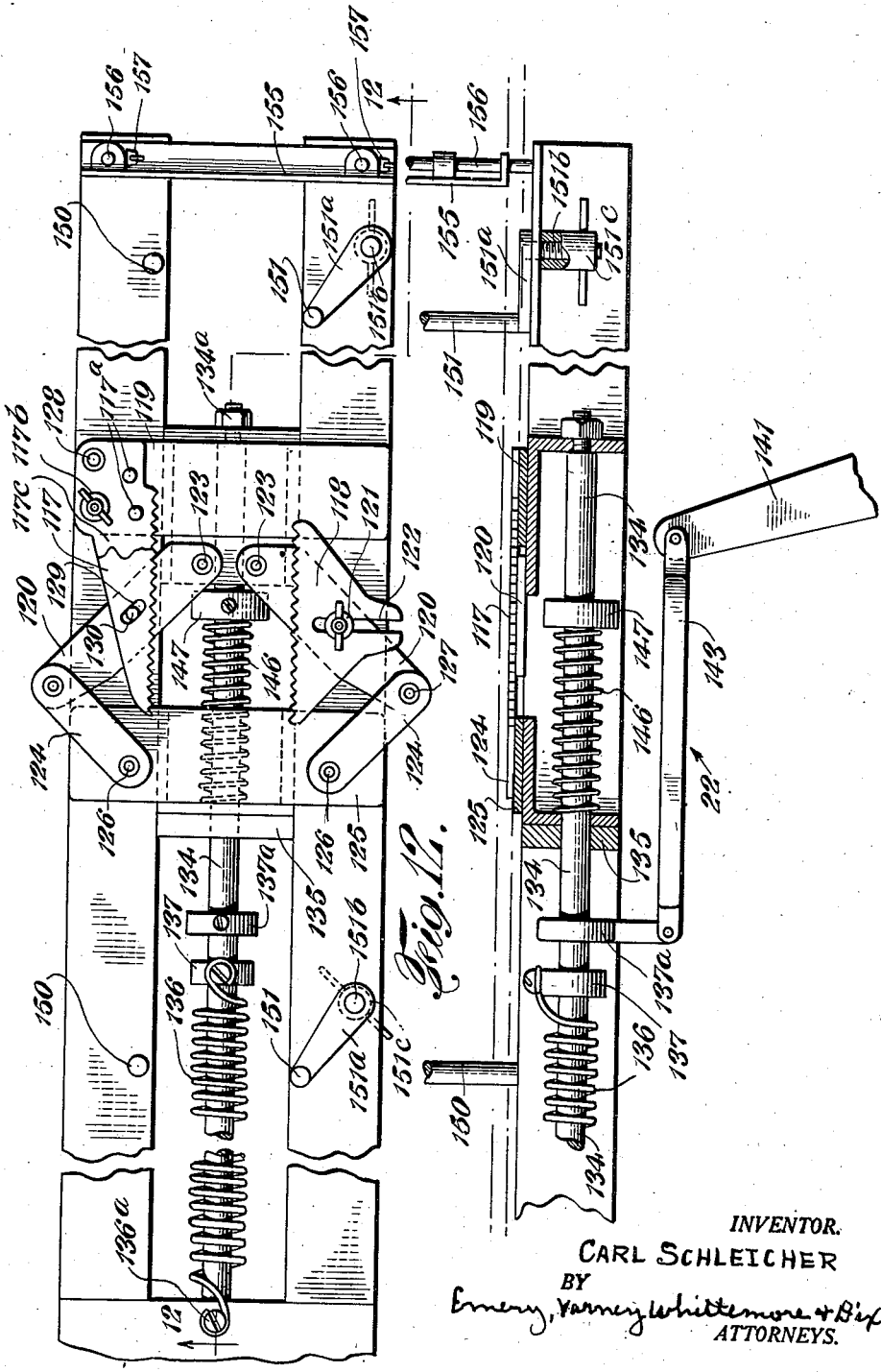

Patented Jan. 25, 1944

2,339,952

UNITED STATES PATENT OFFICE 2,339,952

SURFACE COATING APPARATUS

Carl Schleicher, New York, N. Y., assignor to Threefold Corporation, New York, N. Y., a corporation of New York Application March 12, 1941, Serial No. 382,906

10 Claims. (Cl. 91—13)

This invention relates to apparatus for coating the surfaces of elongated articles and has for an object the provision of improvements in this art.

The machine is adapted for such work as painting the slats and rails of Venetian blinds which are of different thicknesses and widths. The construction permits quick adjustment to accommodate strips of different thickness, profile, or width and this is done without upsetting the fixed relationship between the feeding means and the coating means or changing the set adjustment for the thickness of the coat.

The strips of Venetian blinds frequently carry dust from forming operations or storage, and the strips of old blinds which require repainting in renovating operations are also usually covered with dust so that they need to be thoroughly cleaned before they are painted. According to the present invention the cleaning of the strips, which formerly was a separate operation, is done by the same machine which paints the strips, and the cleaning is done immediately before they are painted. The cleaning means is mounted for adjustment along with the coating and feeding means, hence this also automatically adapts its action for strips of different thickness in accordance with the adaptation of the coating means.

The machine provides initial feeding means for taking the strips from a supply and additional feeding means immediately ahead of the coating means for presenting the strips directly to the coating means. The cleaning means is disposed between the two feeding means and is partitioned from the coating means so it will not spread dust thereto. The two feeding means, disposed as they are, support the strip fully in a definite position between the upper and lower coating elements and guide it accurately between the side coating elements.

The invention provides improved means for adjusting the upper part of the machine vertically relative to the lower part of the machine and of the coating material supply or applicator means relative to the coating means for both faces and improved mounting and adjusting means for the edge coating means. In addition the inventon provides improved intermittently operating feeding means for starting strips into the machine.

In order to furnish a more precise understanding of the nature and objects of the invention, one specific embodiment will be described in connection with the accompanying drawings wherein:

Fig. 2 is a companion right side elevation;

Fig. 3 is a front elevation;

Fig. 4 is a sectional elevation at the rear end, taken on the line 4—4 of Fig. 1;

Fig. 5 is a sectional plan taken on the line 5—5 of Fig. 1;

Fig. 6 is a central vertical section taken on the line 6—6 of Fig. 5;

Fig. 7 is a partial transverse sectional elevation taken on the line 7—7 of Fig. 1 in front of the edge coating mechanism.

Fig. 8 is a horizontal section taken on the line 8—8 of Fig. 7;

Fig. 9 is an elevation of the left side of Fig. 7;

Fig. 10 is a vertical section on the line 10—10 of Fig. 7;

Fig. 11 is an enlarged plan of a portion of Fig. 5, showing the feed-in mechanism;

Fig. 12 is a central vertical section on the line 12—12 of Fig. 11; and

Figs. 13 and 14 are views of adjustment details.

Figure 1:
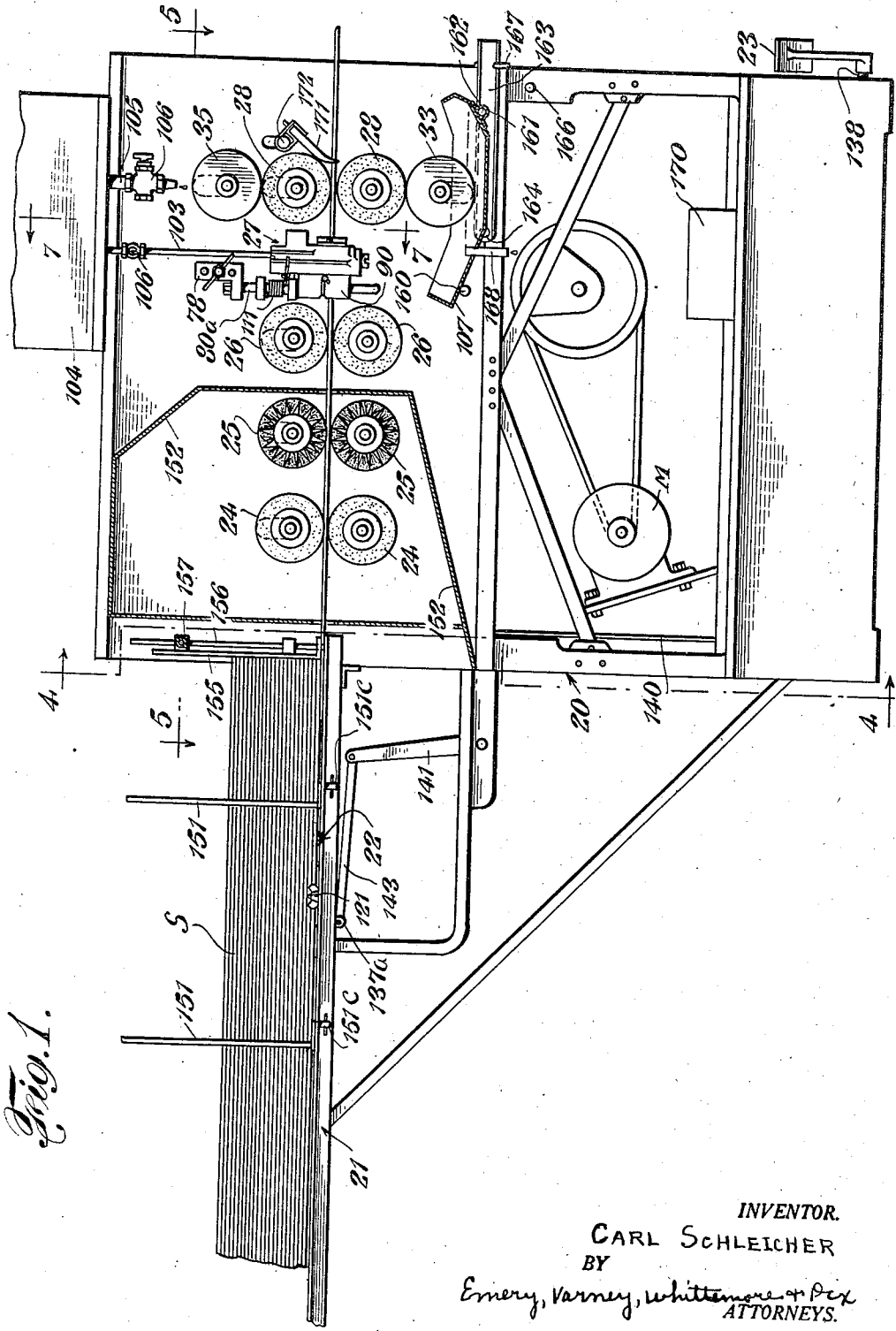
Fig. 1 is a left side elevation.

The machine selected to illustrate the invention and shown in the drawings comprises a main frame 20 provided with a long table 21 at the rear adapted to support a stack of strips S, such as slats, rails or the like. From this stack the bottom strip is fed into the coating mechanism by the feed-in mechanism 22 which is operated intermittently by the operator through a treadle 23 or by some automatically controlled operating mechanism. The strip passes to a first or rear set of feed rolls 24, then between a pair of cleaning rolls or rotary brushes 25, to a second or front set of feed rolls 26, to edge coating rolls 27, and finally through a set of face coating rolls 28. When the strip emerges coated on both faces and both edges, or such of these surfaces as may be desired, it is taken by an operator and placed on a drying rack.

The lower ones of the rear pair of feed rolls 24, the cleaning rolls 25, the front feed rolls 26, and the face coating rolls 28 are all mounted on a fixed frame 30 and the companion rolls of these are mounted upon an adjustable frame 31. Below the fixed frame 30 an adjustable sub-frame 32 is provided to carry a supply or applicator roll 33 for furnishing coating material to the lower coating roll 28. Above the adjustable frame 31 an adjustable super frame 34 is provided to carry a supply or applicator roll 35 for furnishing coating material to the upper coating roll 28.

Conveniently, the frames 30, 31, 32 and 34 are all mounted upon a plurality of vertical rods 36— four shown—secured in the main frame 20, the frame 30 being fixed in position on the rods as by set screws or the like, and the frames 31, 32 and 34 being slidable on the rods as guides. The frames 30 and 31 are mounted on all four rods and the smaller frames 32 and 34 are mounted on the two front rods.

Suitable means for adjusting the movable frames may comprise off-center devices such as eccentrics or the like. For the adjustable frame 31 the illustrated mechanism comprises an eccentric-mounting plate 40 pivoted to the fixed frame 30 at 41 and carrying the eccentric 42 in a circular opening at its swingable end. The eccentric is eccentrically secured to a shaft 43 which passes through bearings in the movable frame 31 and connects to the eccentric of corresponding mechanism at the other end of the frame. The eccentric at the front end is turned through a gear 47 fast thereon by a pinion 45 meshing with the gear 47, the pinion being fast on the knob shaft 46, which is mounted in the plate 40, and turned by a hand knob 44 thereon. The eccentrics and the gear 47 are locked in adjusted position by a nut 48 on the shaft 43.

The sub-frame 32 is provided with similar adjusting mechanism, though the throw is less than for the frame 31, whereas the latter provides a large adjustment for wide differences in strip thicknesses, the former need only provide for different thicknesses of coating material supplied to the coating rolls. Here the eccentric-mounting plate 50 is pivoted to the fixed frame 30 at a suitable point, which here coincides with the pivot point 41, and carries the eccentric 52 in a circular opening at its free end. The eccentric is eccentrically secured to a gear 57 and with it is rotatable on a shaft 53 rigidly secured in the frame 32 as by being threaded therein and held by a lock nut 58. Adjustment is made by a pinion 55 on a shaft 56 mounted in the frame 32 and turned by the hand knob 54. The gear 57 after adjustment is locked against the plate 50 to prevent turning by a nut 59 on the shaft 53.

The movable super frame 34 is similarly adjusted except that instead of being adjusted relative to a fixed part it is adjusted relative to the movable frame 31 since the coating supply roll 35 serves the adjustable face coating roll 28 on the movable frame 31. Here the mechanism comprises the eccentric-bearing plate 60 pivoted to the frame 31 at a suitable point, which here coincides with the shaft 43, and carrying the eccentric 62 in a circular opening at its free end. The eccentric is eccentrically mounted beneath a head or end flange 68 on a shaft 63 rotatably mounted in the frame 34. A gear 67 is splined to the shaft so as to have some longitudinal movement thereon by a feather pin 67a extending through a hole in the shaft and into slots in the bore of the gear. Adjustment is made by a pinion 65 on a shaft 66 mounted in the frame 34 and turned by the hand knob 64. The gear is locked in adjusted position by a nut 69 on the front end of the shaft 63.

The horizontal rolls are all positively driven in unison as by a sprocket chain 70 passing over sprockets 24a, 25a, 26a, 28a, and 35a of the respective rolls 24, 25, 26, 28, and 35 and a power sprocket chain 71 driven from a power shaft 72 passing over a sprocket 28b of the lower roll 28 and a sprocket 33a of the roll 33. The sprocket chain 70 passes over an idler take-up sprocket 73 carried on a spring biased arm 74 pivoted at 75. This permits roll adjustment without disturbing the drive of the rolls. The disposition of the sprocket 33a relative to the sprocket chain 71 permits of the small adjustment necessary for roll 33 while maintaining the drive.

The edge coating rolls 27 are so formed and disposed that they need not be positively driven but are turned by the strip in passing and do not require applicator rolls but themselves dispense the coating material directly from the source to the strips.

The rolls 27 are mounted upon a side roll frame 78 secured to a vertical plate 79 of the main frame. The inner roll assembly is swingably mounted on a depending stud 80 carried by the frame 78, the roll assembly being held up by a spring 81 engaging an annular groove 82 in the stud. This arrangement permits very quick removal and replacement of the roll assembly, it being only necessary to pull the spring out of the groove and slide the assembly off.

The other roll 27 is mounted in a similar fashion by a spring 81a engaging the annular groove 82a of a depending stud 80a. The stud 80a is adjustable, being mounted upon a slide block 83 carried by two horizontal guide and support studs 84 secured to the side roll frame 78 and adjusted by a threaded screw 85 provided with a hand piece 86. The shaft 85 is threaded in the block 83 and is rotatably mounted in the frame 78. Collars 87 prevent endwise movement of the screw 85.

The side roll assemblies are alike except paired. Each comprises a support 90 slidably mounted on the vertical stud 80 or 80a as just described and including a cup 91 in which the roll 27 is rotatably mounted on an upstanding stud 92 threaded in a nut 93 fitting tightly in the bottom of the cup and secured by a set screw 94.

The cup is provided with a side opening 95 having adjustable wiper inserts 96 shaped to fit the longitudinal contour of the roll to retain the coating material except such as is carried out by the roll past the wipers. The rolls shown are straight sided for straight edged strips (or for curved strips if quite thin) so the wipers are straight. For convex edged slats concave rolls and convex wipers would be used—and so on for other shapes of edges.

The rolls 27 are grooved vertically or knurled to assist in holding the coating material evenly thereon. They press against the strips and deposit the layer of coating material on its edges. A brush 97 disposed immediately forward of the roll brushes the material on evenly. The brushes are adjustable for depth as by slots 98 and a set screw 99.

Coating material is supplied to the cups 91 by flexible or easily bendable tubes 103 from a reservoir 104 on the top of the main frame. A tube 105 supplies the upper horizontal applicator roll 35. Each tube is provided with a hand cut-off cock 106. The lower horizontal applicator roll 33 is supplied from a pan 107 which also catches the drip from the side rolls. There may be a small leakage around the side rolls 27 but this will not matter because only the peripheries of the rolls at the inside engage the strip. The cups are kept full and there may be some overflow from the tops of the cups. For this purpose the outer edge of each cup is provided with a V-notch 108 and a vertical groove 109 which leads down the outside of the cup.

The side rolls 27 are urged toward the strip by springs 111 secured to adjustable collars 112 attached to the depending studs 80, 80a. The inward movement of the rolls is limited by stud screws 113 secured in adjustable collars 114 on the studs 80, 80a. This arrangement prevents the rolls from jumping and skipping a space when the end of a strip is fed in, yet holds against the edges strongly enough to turn the rolls and coat properly. The spring is kept from unwinding when the roll assembly is removed by a pin 115 in the collar 114.

The feeding mechanism 22 for advancing strips intermittently from the bottom of the stack to the rear feed rolls when the treadle 23 is depressed by the operator grips the strips with a predetermined pressure which is independent of the pressure on the treadle. Also, if the strip meets with an obstruction to its progress as, for example, the rear end of a preceding strip, it will not be injured.

This feeding mechanism comprises gripping jaws 117 and 118, the first of which is disposed (in gripping position) with its gripping face on the line along which the rear edges of the strips travel through the machine and the second of which is adjustable to take different widths of strips. The first is pivoted to a forward slide 119 and the second is secured to one of the long links 120 of a toggle mechanism by a bolt 121 adjustable in a slot 122 of the jaw. The front ends of the long toggle links 120 are pivoted at 123 to the front slide 119 and the rear ends of the short links 124 of the toggle are pivoted to a rear slide 125 at 126. The links are pivoted together at 127. The pivot of the relatively fixed jaw 117 on the front slide 119 is at 128 and the jaw is provided with a slot 129 for a pin 130 of one of the long links 120, whereby it is moved slightly away from the strip edge when retracted for return movement and is moved into line and in parallel when gripping a strip.

Means are provided for readily adapting the feed to strips of different thickness. As here shown, the jaw 117 is provided with upwardly projecting dowels 117a and a stud 117b whereby an additional jaw laminae 117c may be secured thereto for greater gripping depth for thicker strips. The adjustable jaw 118 may readily be exchanged for a thicker one for thicker material.

A push rod 134 is secured to the front slide 119 as by a nut 134a and passes through guide openings in the rear slide 125 and in a fixed rear abutment 135. The push rod is constantly urged rearwardly against the action of the operator by a relatively strong spring 136 secured to adjustable collar 137 on the push rod and to a suitable fixed stop 136a. The linkage from the streadle to the rod includes the oscillating shaft 138, lever 139, connecting rod 140, bell crank lever 141 pivoted at 142 to the main frame, and the link 143 connected to the collar 137a adjustably secured on the rod 134.

The rear toggle slide 125 is urged rearward relative to the push rod 134 by a relatively light spring 146 acting between the front of the slide and the rear of an adjustable collar 147 on the push rod.

This construction provides that the strips will be engaged with a uniform force regardless of the foot pressure on the treadle thus avoiding injury to the strips. By adjusting the collar 147 along the push rod the effective force of the spring may be varied.

The stack of strips is held by a line of fixed standards 150 and a line of adjustable standards 151. The fixed standards determine the line along which one edge of the strips travels through the machine. The feed rolls permit the strip to take up any lateral position but the side coating rolls acts under spring pressure to keep the strips in the line determined by the standards, though their springs permit these rolls to move sufficiently to accommodate any necessary variations.

The standards 151 are set in the ends of blocks 151a secured upon pins 151b passing through a flange of the table and locked in adjusted positions by nuts 151c. This provides adjustment by a swinging movement of the blocks and quick release and refastening.

The upper strips are held against forward movement by a shutter 155 adjustably held on posts 156 by set screws 157.

When the operator presses the treadle the push rod 134 moves forward against the strong spring 136, carrying with it the front slide 119. The rear slide 125 remains in engagement with the abutment 135 by reason of the action of the clamping spring 146 until the jaws engage the side edges of the bottom strip of the stack. Thereafter the whole assembly together with the engaged strip moves forward until the forward end of the strip is taken by the rear feed rolls. If the strip is fed faster than the feed rolls can take it or if it strikes the rear end of the preceding strip, the jaws simply slide along the strip; but they will not injure it because of the light pressure of the spring. As soon as the strip has been engaged by the feel rolls the operator releases the treadle and when the rear slide strikes the abutment the jaws are positively pressed outward by the action of the front slide and links to release the strip.

When a strip is fed forward by the rear feed rolls it arrives first at the cleaning rolls 25 which sweep the dust backward into a hood 152.

As the strip, passing from the front feed rolls 26, reaches the edge coating rolls 27 they spring open from their stops 113 to receive it. The rolls 27 apply the coating material and the brushes 97 smooth it on.

From the edge coating rolls the strip passes to the face coating rolls 28 where the faces are coated in an obvious manner. It is guided out and removed by an operator.

The setting of the applicator rolls 33 and 35 relative to their companion coating rolls 28 determines the thickness of the face coatings. It has already been seen how the applicator rolls are adjusted without disturbing the setting of the coating rolls, and vice versa.

The independent shaft bearings 25b of the brushes 25 may be quickly and accurately set in different adjusted positions to compensate for brush wear by loosening the set screws which hold them and inserting one or more shims of predetermined thickness.

The bearings of all of the horizontal rolls may be quickly and inexpensively formed by placing brushings of suitable material at proper places on the shafts, aligning the shafts accurately with the bushings disposed in oversized openings in the castings, and then pouring and hardening a body of metal, such as babbitt or the like, about the bushings.

The drip pan 107 maintains a constant level of coating material for roll 33 during operation. It may be swung down with this fixed amount of material to retain it while cleaning the rolls. And it may readily be removed for emptying and cleaning. To this end the pan is mounted at its rear end on a fixed stud 160 as by merely resting thereon. At its front end it is provided with a transverse sleeve 161 loosely surrounding a movable stud 162 carried by a swingable arm 163 pivoted to a fixed bolt 164 and pressed against the side of the frame by a spring 165. The arm may be swung down to a fixed stop 166 or raised to operating position where it is held by a latch 167. An overflow opening 168 determines the height at which coating material will stand during operation. To remove the pan it is only necessary to slide it endwise off the studs 160 and 162. A vessel 170 may be provided for catching all the overflow material. At periods this may be emptied into the supply tank on the top of the machine.

End wipers 171 are provided for the upper coating roll 28, the wipers being adjustably mounted on a fixed stud 172. They intercept excess coating material near the ends of the roll and cause it to drip down on the sides clear of the strip. The lower roll does not need this. If there is any drip from its ends it will fall directly into the drip pan.

It is thus seen that the invention provides an improved coating machine which operates rapidly and effectively; and which may be quickly adjusted for different widths, profiles, or thicknesses of strips without disturbing the coating thickness or the relationship between the coating means and the feeding and cleaning means. If desired, the shutter may also be carried on the adjustable frame to take care of the retention of the upper strips when adjusting for strips of different thickness. It also provides for accurate independent adjustment for thickness of coating material, and for the setting of the cleaning rolls. The side coating rolls are mounted below their supports and are very readily adjusted or removed. The horizontal roll bearing mountings are such as to be easily placed even in out of true castings and avoid delays for replacing worn out bearings. The feed-in mechanism is of an improved, simple and effective design which is readily adjusted for strips of different thickness, width or profile. Also the drip pan is readily shiftable for cleaning the rolls or removable for changing colors or shutting down.

While one embodiment of the invention has been specifically illustrated and described to give a clear conception of the invention, it is to be understood that the invention may have various embodiments within the limits of its novelty.

I claim:

1. Apparatus for coating elongated strips, comprising in combination, a pair of feed rolls, a pair of cleaning rolls, a second pair of feed rolls and a pair of coating rolls arranged in the order named, a fixed frame carrying one roll of each pair, a movable frame carrying the other roll of each pair, and means for adjusting said movable frame with all of its rolls relative to the fixed frame.

2. Apparatus for coating elongated strips, comprising in combination, a pair of feed rolls, a pair of coating rolls, a fixed frame carrying one roll of each pair, a movable frame carrying the other roll of each pair, and means for adjusting said movable frame with all of its rolls relative to the fixed frame.

3. Apparatus for coating elongated strips, comprising in combination, a pair of feed rolls, a pair of coating rolls, a fixed frame carrying one roll of each pair, a movable frame carrying the other roll of each pair, said movable frame being mounted in guides to keep it parallel with the fixed frame, and means for adjusting said movable frame with all of its rolls relative to the fixed frame, said adjusting means including a shaft provided with off-center elements at each end cooperating with the ends of the frame, supporting means for said shaft at each end, and means for rotating said shaft.

4. Apparatus for coating elongated strips, comprising in combination, a pair of horizontal coating rolls, a pair of feed rolls, a pair of vertical coating rolls between the feed rolls and the horizontal coating rolls, one of said horizontal coating rolls being mounted on a fixed support and the other horizontal coating roll being mounted on an adjustable support, swingable means mounted on spaced supports carrying said vertical coating rolls, resilient means urging said swingable roll-carrying means in work engaging direction, and stops for limiting the inward movement of said roll-carrying means.

5. Apparatus for coating elongated strips, comprising in combination, a pair of feed rolls, a pair of coating rolls, a fixed frame carrying one roll of each pair, and a movable frame carrying the other roll of each pair, an applicator roll adjustable relative to the fixed coating roll, and an applicator roll normally carried with the movable coating roll but adjustable relative thereto.

6. Apparatus as set forth in claim 5 in which the applicator rolls are also provided with mounting frames, and in which common guide rods are provided for mounting all of said frames.

7. Apparatus for coating elongated strips, comprising in combination, a vertical coating roll for feeding and applying coating material, a casing mounting said roll including a cup-like chamber for coating material about the roll and an opening on the side to expose the outer portion of the roll, and adjustable wipers in the opening on the sides of the roll.

8. Apparatus as set forth in claim 7 which further includes a horizontally adjustable vertical brush for smoothing the coating material applied by said roll.

9. Apparatus for coating strips, comprising in combination, a coating roll, an applicator roll therefor, a drip pan for holding coating material in which said applicator roll runs, the pan being provided with an outlet for limiting the level in normal position, a pivot stud supporting one end of the pan, a stud carried by a swingable arm supporting the other end of the pan, a stop for limiting the downward movement of the arm, a latch for holding the arm and pan in upper position for normal operation, and connections between said pan and studs permitting it to be readily slipped on and off endwise of the studs.

10. Apparatus for coating elongated strips, comprising in combination, two parallel frames movable relative to each other and each adapted to support a plurality of horizontal parallel coating and feed rolls, a plurality of roll shafts mounting said rolls, bearing bushings on said shafts, said frames having oversize bearing openings for said bushings, poured metal mountings for said bushings in said openings, and applicator rolls adjustable relative to each of said coating rolls independently of the relative movement between said rolls.

CARL SCHLEICHER.